US012290949B1

(12) United States Patent
Abrams

(10) Patent No.: US 12,290,949 B1
(45) Date of Patent: May 6, 2025

(54) RAZOR BLADE PROTRACTION/RETRACTION DEVICE

(71) Applicant: Howard Abrams, Brigantine, NJ (US)

(72) Inventor: Howard Abrams, Brigantine, NJ (US)

( * ) Notice: Subject to any disclaimer, the term of this patent is extended or adjusted under 35 U.S.C. 154(b) by 309 days.

(21) Appl. No.: 18/072,168

(22) Filed: Nov. 30, 2022

Related U.S. Application Data

(60) Provisional application No. 63/285,155, filed on Dec. 2, 2021.

(51) Int. Cl.
*B26B 5/00* (2006.01)
*B25G 1/08* (2006.01)
*B26B 29/02* (2006.01)

(52) U.S. Cl.
CPC ................ *B26B 5/006* (2013.01); *B25G 1/08* (2013.01); *B26B 29/02* (2013.01)

(58) Field of Classification Search
CPC ............ B26B 5/006; B26B 29/02; B25G 1/08
See application file for complete search history.

(56) References Cited

U.S. PATENT DOCUMENTS 2,209,751 A * 7/1940 Wulff ...................... B26B 5/006 30/2
3,453,731 A * 7/1969 Wertepny, Sr. ......... B26B 13/28 30/267
3,641,667 A * 2/1972 Leopoldi ................. B26B 5/005 30/2
4,683,656 A 8/1987 Peyrot et al.
4,922,610 A 5/1990 Szabo
5,727,319 A 3/1998 Myerchin et al.
5,813,083 A * 9/1998 Gould ..................... A63F 3/068 30/162
6,454,427 B1 9/2002 Chen
6,532,670 B1 3/2003 Berns
6,813,833 B2 11/2004 Saunders et al.
(Continued)

FOREIGN PATENT DOCUMENTS

CN 208276946 U 12/2018

OTHER PUBLICATIONS

"Lever Action-9 Safety Knife (SC-2406)", SafeCutters, © 2017, retrieved on Sep. 20, 2023 from https://www.safecutters.com/product/lever-action-9-safety-knife-sc-2406/.

*Primary Examiner* — Liang Dong
(74) *Attorney, Agent, or Firm* — Caesar Rivise, PC

(57) ABSTRACT

A hand-held safety cutting device that facilitates an operator cutting a material without having to tilt the cutting device while cutting and minimizing the operator exposure to the cutting blade pivotally connected therein. The device includes a biased safety slide which must first be placed in an enabling state before the operator can depress a biased activator to pivotally-extend a portion of the blade out of the housing bottom to permit cutting or scoring the material. The blade is releasably installed in a blade holder that is pivotally-biased. The operator must maintain pressure on the activator during cutting/scoring. Once pressure is released on the activator, the blade immediately pivots into the housing and the safety slide moves to a disabling state, preventing any depression of the activator. A cover provides access to install different razor blade types. Another embodiment includes a storage that permits additional blades and blade holders to be stored therein.

15 Claims, 11 Drawing Sheets

(56) References Cited

U.S. PATENT DOCUMENTS

| | | | |
|---|---|---|---|
| 8,056,241 B2 | 11/2011 | Davis et al. | |
| 8,250,764 B2 | 8/2012 | Davis et al. | |
| 8,353,109 B2 * | 1/2013 | Rohrbach | B26B 5/003 30/162 |
| 8,683,703 B2 | 4/2014 | Rowlay et al. | |
| 8,732,956 B2 | 5/2014 | McGushion et al. | |
| 8,776,380 B1 | 7/2014 | Quimby et al. | |
| 9,321,578 B2 | 4/2016 | Garavaglia et al. | |
| 9,676,106 B2 | 6/2017 | Garavaglia et al. | |
| 9,808,941 B2 | 11/2017 | Jacobs et al. | |
| 10,093,027 B2 | 10/2018 | Garavaglia et al. | |
| 10,131,059 B2 * | 11/2018 | Ikoma | B26B 1/042 |
| 10,252,428 B2 | 4/2019 | Ranieri et al. | |
| 10,300,615 B2 | 5/2019 | Votolato et al. | |
| 2009/0193664 A1 * | 8/2009 | Galyean | B26B 1/046 30/161 |
| 2011/0289780 A1 | 12/2011 | Tiegs | |
| 2016/0046026 A1 * | 2/2016 | Ranieri | B26B 5/001 30/162 |
| 2016/0214264 A1 | 7/2016 | Garavaglia et al. | |
| 2016/0279811 A1 | 9/2016 | Huang et al. | |
| 2018/0099423 A1 | 4/2018 | Mundhra | |

* cited by examiner

RAZOR BLADE PROTRACTION/RETRACTION DEVICE

CROSS-REFERENCE TO RELATED APPLICATIONS

This non-provisional application claims the benefit under 35 U.S.C. § 119(e) of Application Ser. No. 63/285,155 filed on Dec. 2, 2021 entitled SINGLE EDGE RAZOR BLADE PROTRACTION/RETRACTION DEVICE and whose entire disclosure is incorporated by reference herein.

BACKGROUND OF THE INVENTION

This present invention relates to hand-held cutting devices, and more particularly, to a cutting device that facilitates the operator in cutting while reducing exposure to cutting edges.

Currently, hand-held cutters such as scissors or box cutters are linear devices which means that the user has to tilt the device during the cutting process. Moreover, where box cutters are involved, the cutting member is typically retractable so that the user can extend the cutting member forward to cut and then retract the cutting member into the device housing to stow it safely. And the cutting member is extended or retracted along the longitudinal axis of the elongated device housing. Furthermore, these blades can be "straight" blades (also referred to as "single edge razor blades"), "trapezoidal" blades (also referred to as "utility blades") or "carpet hook" blades.

However, there remains a need for a hand-held cutter that makes it easier for a user to cut a material while minimizing the danger of exposure to the cutting blade. The present invention solves these problems.

All references cited herein are incorporated herein by reference in their entireties.

BRIEF SUMMARY OF THE INVENTION

A hand-held cutting device for cutting a material with a safety feature that maintains a cutting blade retracted in the device is disclosed. The cutting device comprises: a housing having an aperture in a bottom surface thereof through which a portion of the cutting blade can pass; a blade holder that is pivotally-mounted within the housing and biased to maintain the blade, releasably secured within the blade holder, within the housing; an activator, operable by a user, that contacts and pivots the blade holder to push a portion of the blade out of the aperture when the user applies pressure on the activator, wherein the activator is biased against user operation; a safety member operable by the user that must be displaced from a first position to a second position that enables the activator to be operated by the user, wherein the safety member is biased against movement to the second position; and wherein whenever the user releases pressure on the activator, the activator is automatically moved out of contact with the blade holder to automatically pivot the blade within the housing and the safety slide is automatically moved to the first position, preventing any further operation of the activator.

BRIEF DESCRIPTION OF SEVERAL VIEWS OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE PREFERRED EMBODIMENTS

Figure 1:
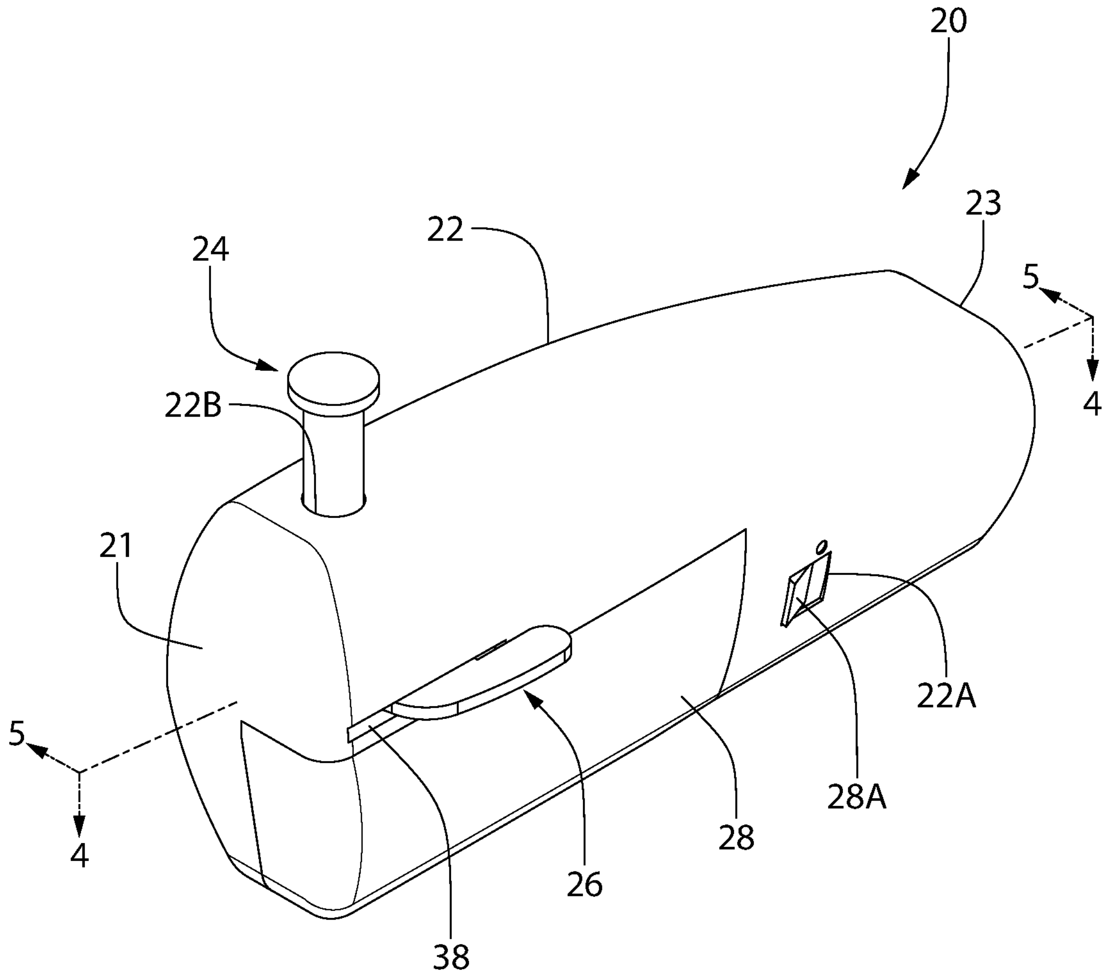
FIG. 1 is an isometric view of the hand-held safety cutting device of the present invention from the front and side and wherein the cutting device is shown in the "safe" mode wherein the cutting blade is completely retracted within the cutting device.

Referring now to the figures, wherein like reference numerals represent like parts throughout the several views, exemplary embodiments of the present disclosure will be described in detail. Throughout this description, various components may be identified having specific values, these values are provided as exemplary embodiments and should not be limiting of various concepts of the present invention as many comparable sizes and/or values may be implemented.

FIG. 1 depicts the hand-held safety cutting device (SCD) 20 of the present invention which permits a user to cut or score a material by holding the SCD 20 in position parallel to the material being cut, or scored, without having to tilt the device (see FIG. 9), as is required in conventional cutting devices. Moreover, the SCD 20 also protects the user from being exposed to the blade and only allows the blade to be exposed in a cutting mode ("FIG. 7") when the user is purposely placing the SCD 20 into the cutting mode. As such, when the SCD 20 is not being used and is placed on a surface or toolbox, etc., there is no way someone can be inadvertently cut or harmed by the SCD 20 because the blade is always completely retracted inside a housing.

Figure 2:
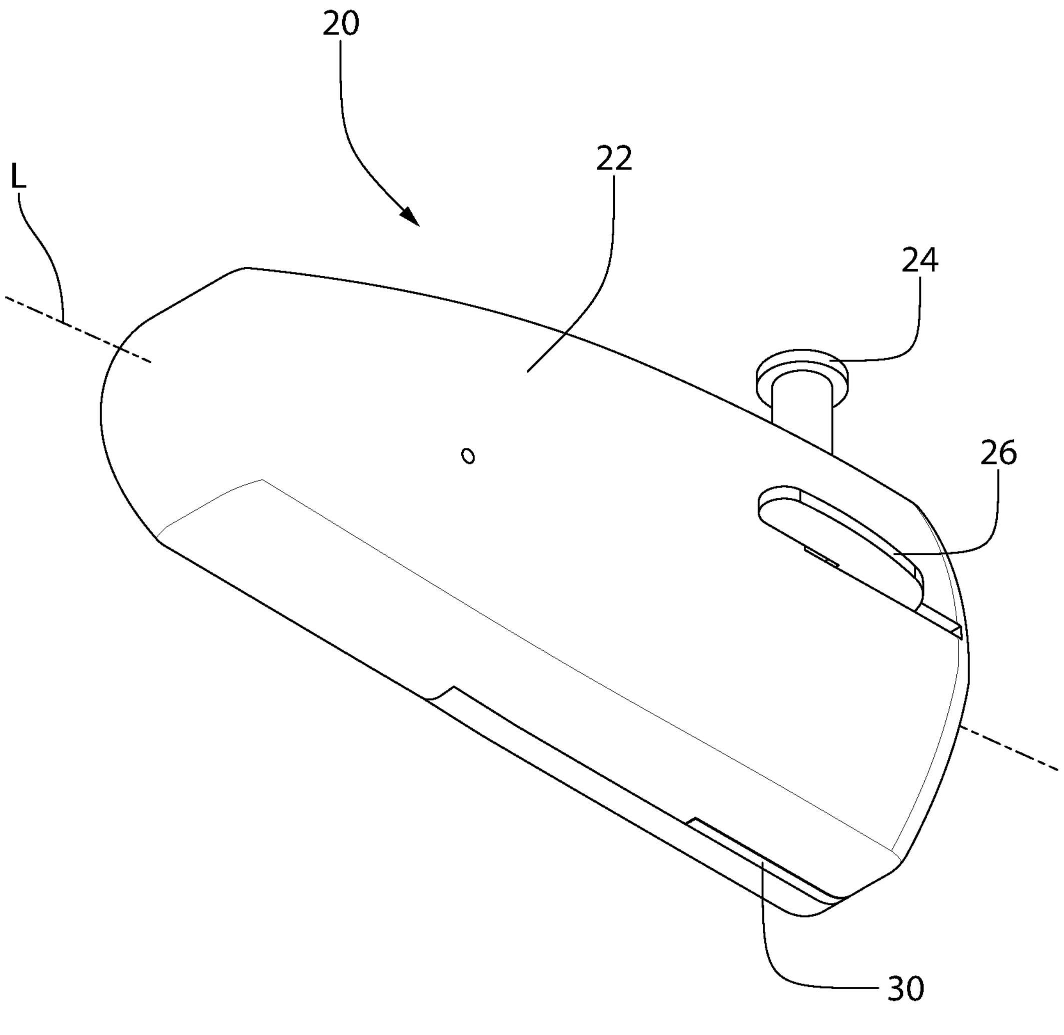
FIG. 2 is an isometric view of the safety cutting device of the present invention from the rear and bottom and where in the cutting device is also shown in the "safe mode"

In particular, the SCD 20 comprises a housing 22 having a displaceable activator 24, a safety slide 26 and an access panel or cover 28 that provides access to the razor blade when replacing. The housing 22 has a longitudinal axis and with a front end 21 and a rear end 23. When the blade (not shown) does protrude from the housing 22, it does so through an aperture 30 (FIG. 2). The cover 28 has a releasable latch 28A that snaps into a housing aperture 22A. As will be discussed in detail later, when the user displaces the safety slide 26 towards the rear of the SCD 20 and then depresses the activator 24 into the housing 22 through aperture 22B, the razor blade extended out of the bottom of the housing 22 through the aperture 30. As long as the user maintains downward pressure on the activator 24, the safety slide 26 remains in the rearward position, and the razor blade remains extended out of the bottom of the housing 22 through aperture 30. Conversely, as soon as the user releases pressure on the activator 24, the activator 24 is driven upward, causing the blade to retract completely into the housing 22 and the safety slide 26 immediately is pushed forward to disable any downward movement of the activator 24. As such, the safety slide 24 acts as an enabler of the activator 24. Any downward pressure applied to the activator 24 without first displacing the safety slide 26 to the rear of the SCD 20, will not result in any portion of the blade being extended out of the housing 22, thereby preventing someone from inadvertently exposing the blade.

Figure 3:
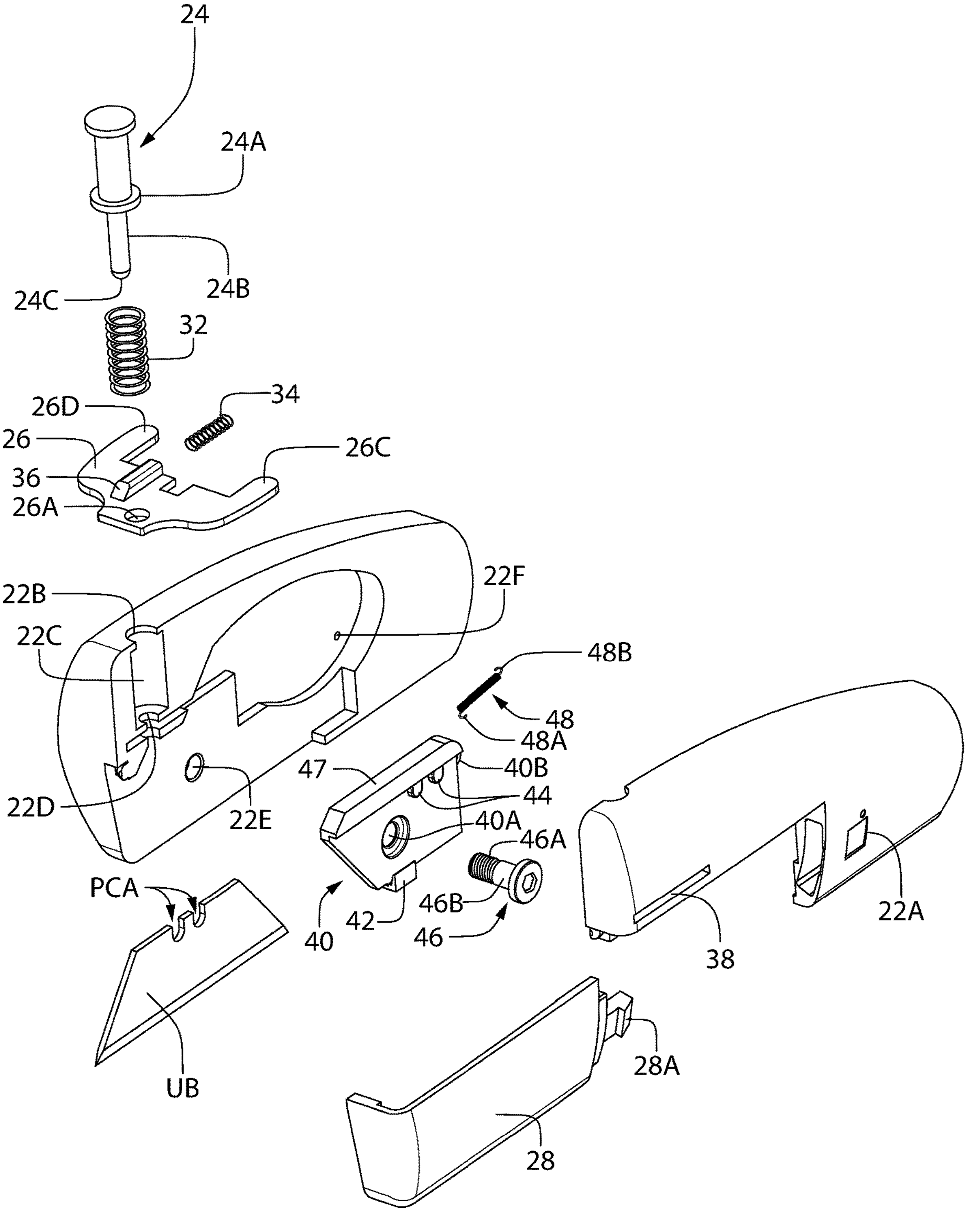
FIG. 3 is an exploded view of the safety cutting device of the present invention showing the activator, the safety slide and the blade and blade holder, among other items.

FIG. 3 shows an exploded view of the SCD 20 and its internal components. The activator 24 comprises a shoulder portion 24A and a shank portion 24B the latter of which is positioned within a spring 32 and this activator assembly 24 is positioned within a passageway 22C of the housing 22. The passageway 22C comprises the upper opening 22B and a lower opening 22D. When the activator assembly 24 is installed in the passageway 22C, the shoulder 24A acts an upper stop against the edge of the opening 22B. When the activator 24 is depressed against the bias of the spring 32, the distal end 24C of the activator 24 is able to pass through the lower opening 22D.

The safety slide 26 comprises a planar member having flanges 26C and 26D that protrude out of respective sides of the housing 22. A sleeve 36 is provided on the top portion of the safety slide 26 for receipt of another spring 34 which is positioned within the sleeve 36. An aperture 26A in the safety slide 26 provides an opening for the distal end 24C of the activator 24 to pass through in order to engage a blade holder, as will be discussed in detail later. When the safety slide assembly 26 is positioned in the housing 22, it is able to slide laterally (front-to-back and vice versa) in a slot 38, against the bias of the spring 34, which biases the safety slide 26 in a forward ("blocking") position. The slot 34 is transverse to said passageway 22C and the sleeve 36 and spring 34 are parallel to said slot 38.

A razor blade, e.g., a utility blade UB or a single edge SE (FIG. 10), is pivotally mounted within the housing 22 using a blade holder 40. The blade holder 40 comprises a lower clasp 42 and mounting nubs 44 for releasably securing the razor blade (i.e., utility blade UB) therein, wherein the lower edge of the blade UB slides over the clasp 42 and aligns a pair of cavities PCA with the nubs 44. The blade holder 40 further comprises an aperture 40A through which a shoulder screw 46 passes to releasably secure and pivotally mount the blade holder 40. The shoulder screw 46 acts as a pivot point for the blade holder 40. It should be noted that the shoulder screw 46 includes threads 46A for threadedly securing into a receiving aperture 22E in the housing 22. A smooth cylindrical portion 46B of the shoulder screw 46 allows the blade holder 40 to smoothly rotate about the shoulder screw 46 under the action of the depressed activator 24 and against the bias of another spring 48. The spring 48 is releasably attached at one of its ends 48A to an aperture 40B on one end of the blade holder 40 and is secured at its other end 48B in an aperture 22F in the housing 22. As seen most clearly in FIG. 5, the spring 48 acts to bias the blade holder 40 in a horizontal position, with the razor blade completely (and safely) retracted within the housing 22 and parallel to a bottom surface of the SCD 20; this movement of the razor blade completely into the housing 22 is also referred to as "retraction."

It should be noted that the blade holder 40 is releasably secured to the housing 22 using the shoulder screw 46. Thus, by way of example only, should the user want to replace the razor blade, i.e., the utility blade UB with another razor blade, e.g., a single edge razor blade SE (FIG. 10), the user would first disengage the cover latch 28A from the aperture 22A in order to remove the cover 28 to gain access to the blade UB/blade holder 40. Next, the user would loosen and remove the shoulder screw 46, disengage the one end 48A of spring 48 from the aperture 40B, remove the current blade/blade holder 40 and attach the blade holder 40' (FIG. 11) to the SCD 20 by passing the shoulder screw 46 through the blade holder aperture 40A' (FIG. 11) and tightening the shoulder screw 46 into the housing 22. Next, the user would reconnect the one end 48A of the spring 48 into the aperture 40B' of the blade holder 40'. The single edge razor blade SE can then be inserted into blade holder 40' by sliding the lower edge of the blade SE over the clasp 42' and seat the nub 44' within a cavity CA in the blade.

Moreover, if the user does not want to replace the type (e.g., replace a utility blade UB with a single edge razor blade SE or vice versa, but want to insert a new blade of the same type, the user does not need to disengage the blade holder 40 or 40'; rather, the user can disengage the existing blade with a new one following the procedure discussed above for each type of razor blade.

Figure 10:
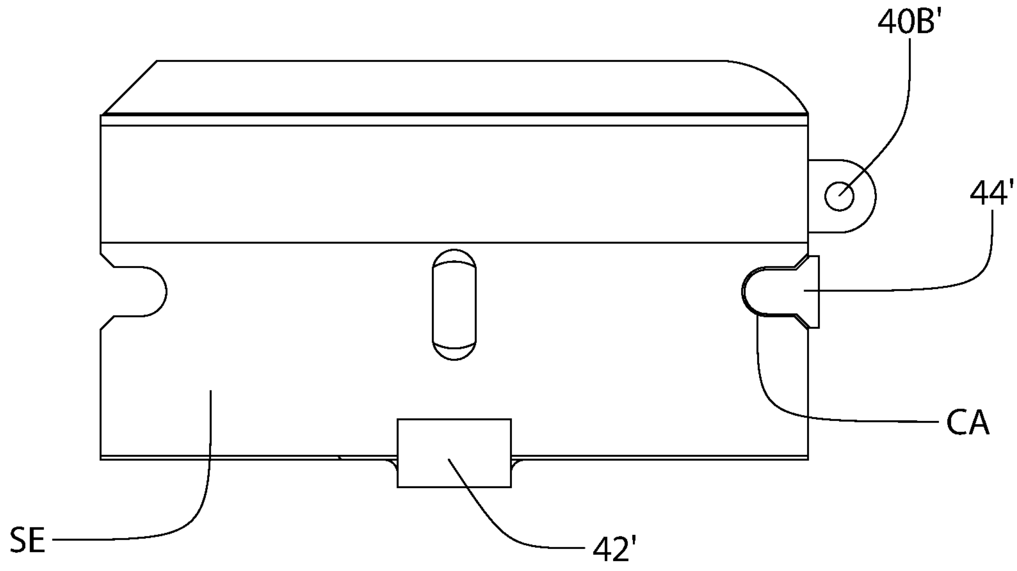
FIG. 10 shows a single edge razor blade installed in an alternate blade holder and which can be installed in the present invention.
Figure 11:
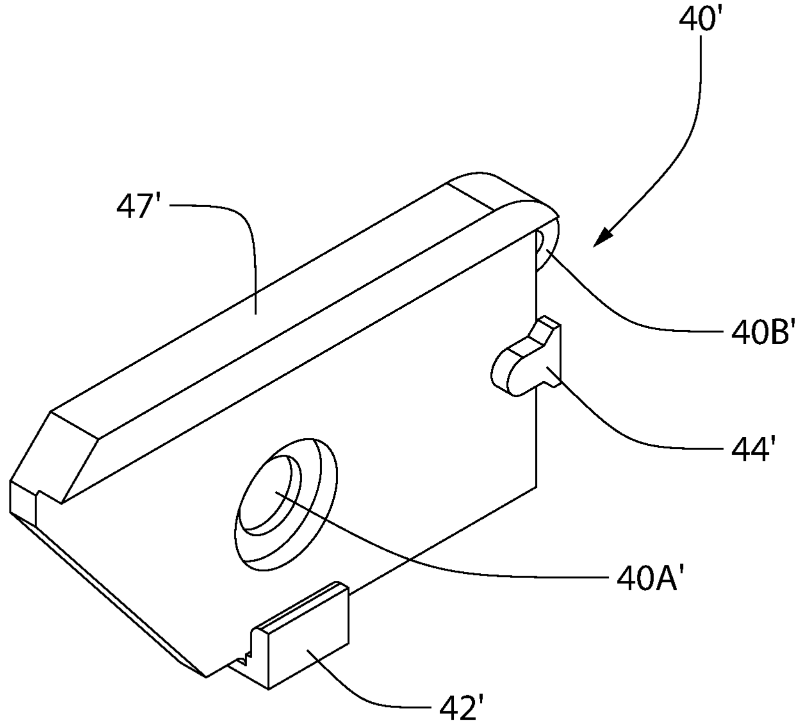
FIG. 11 is an isometric view of the alternate blade holder of FIG. 10.

It should be understood that although a utility blade UB is shown in FIGS. 3 and 5-8, the disclosure is just as applicable to the single edge razor blade SE/blade holder 40' (FIGS. 10-11). Thus, any discussion regarding the utility blade UB is applicable for the single edge blade SE. As such, reference numbers 40', 40A', 40B', 42', 44' and 47' correspond directly with their counterparts 40, 40A, 42, 44 and 47.

Figure 4:
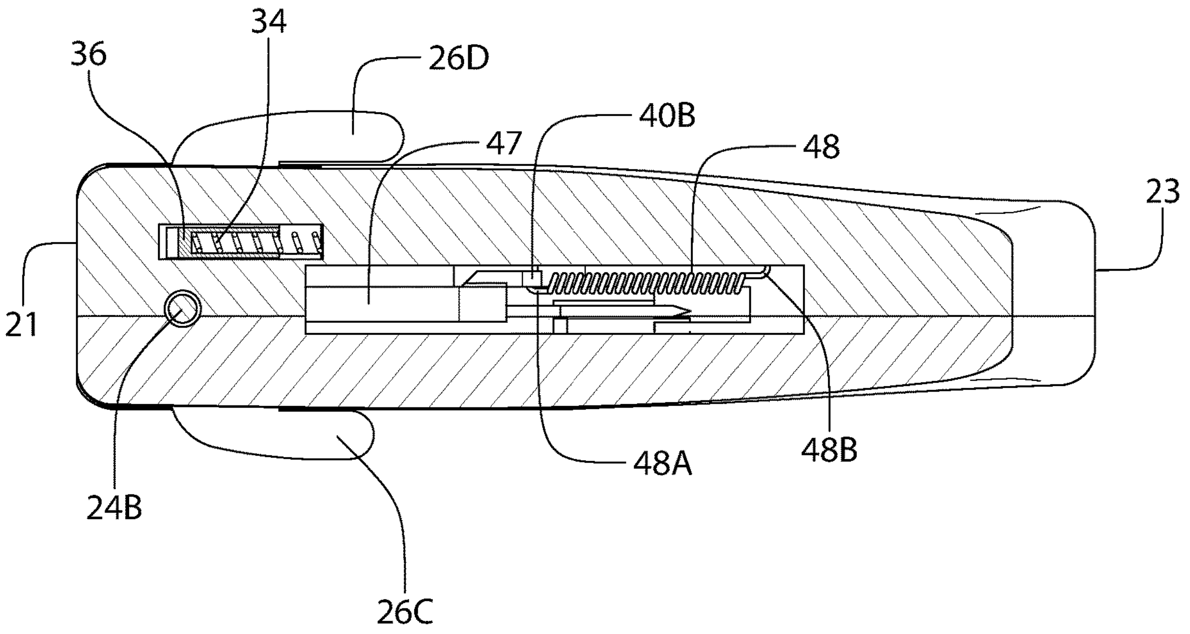
FIG. 4 is a cross-sectional view of the top of the safety cutting device taken along line 4-4 of FIG. 1 showing, among other things, a biasing member, e.g., a spring, that biases the safety slide to be in a "forward" position to prevent depression of the activator.

FIG. 4 provides a cross-sectional view of the SCD 20 that shows the orientation of the spring 34 for the safety slide 26 and the spring 48 for the blade holder 40. As such, movement of safety slide 26 towards the rear 23 of the SCD 20 causes the spring 34 to compress while rotation of the blade holder 40 downward and out of the plane of the figure causes the spring 48 to expand.

In view of the foregoing the sequence of operation of the SCD 20 can now be explained.

Figure 5:
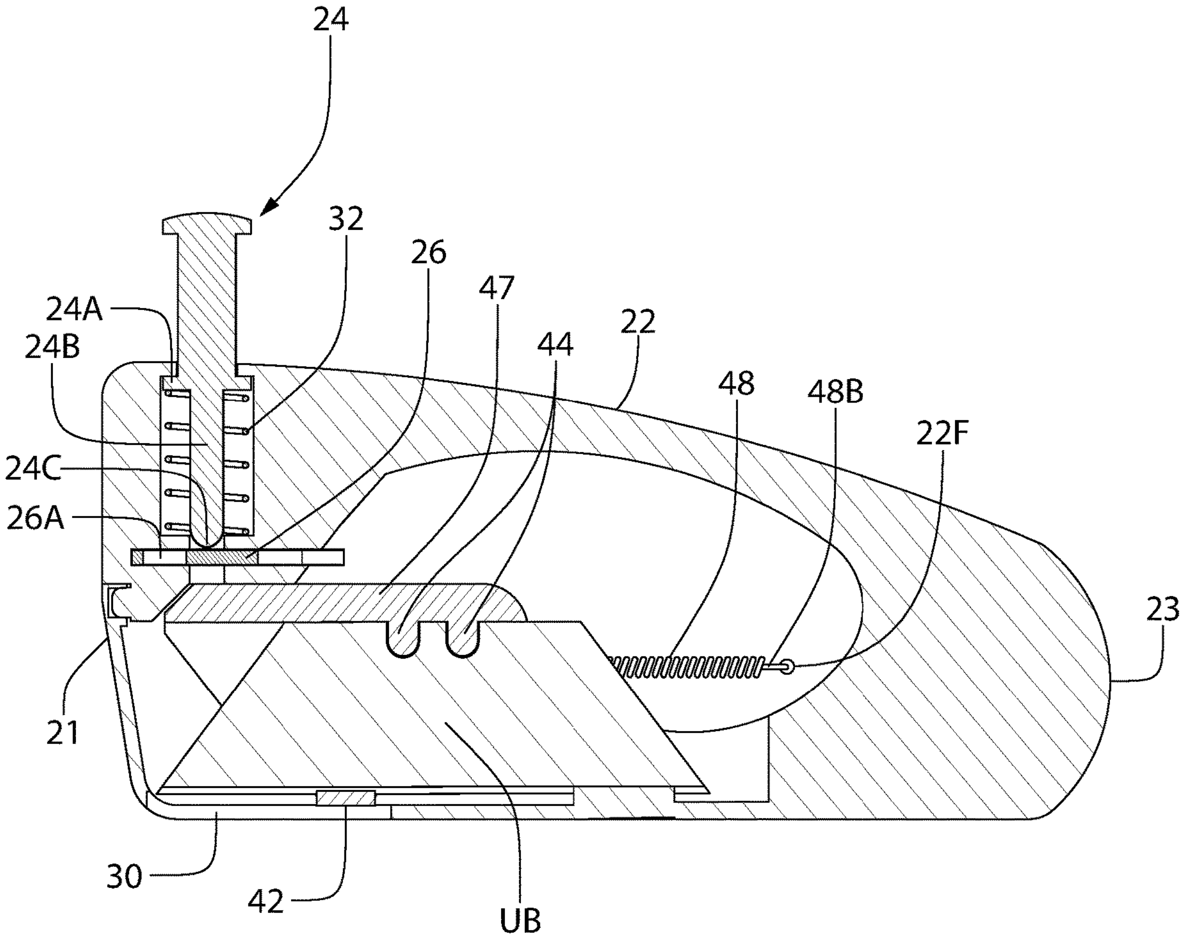
FIG. 5 is a side cross-sectional view taken along line 5-5 of FIG. 1 showing the safety cutting device in the "safe mode" with the blade completely retracted within the housing and the safety slide in the "disabling state", preventing downward movement of the activator.

FIG. 5 is a cross-sectional view of the SCD 20 showing the components in the "safe mode." As can be seen, the spring 34 biases the safety slide 26 in the "forward position" as shown in FIG. 5. As such, the aperture 26A is not aligned with the shank 24B of the activator 24 and the distal end 24C is resting against the safety slide 26. If someone accidentally or purposely tried to depress the activator 24, the safety slide 26 prevents the activator shank 24B from moving downward. As a result, the utility blade UB remains completely within the housing 22.

Figure 6:
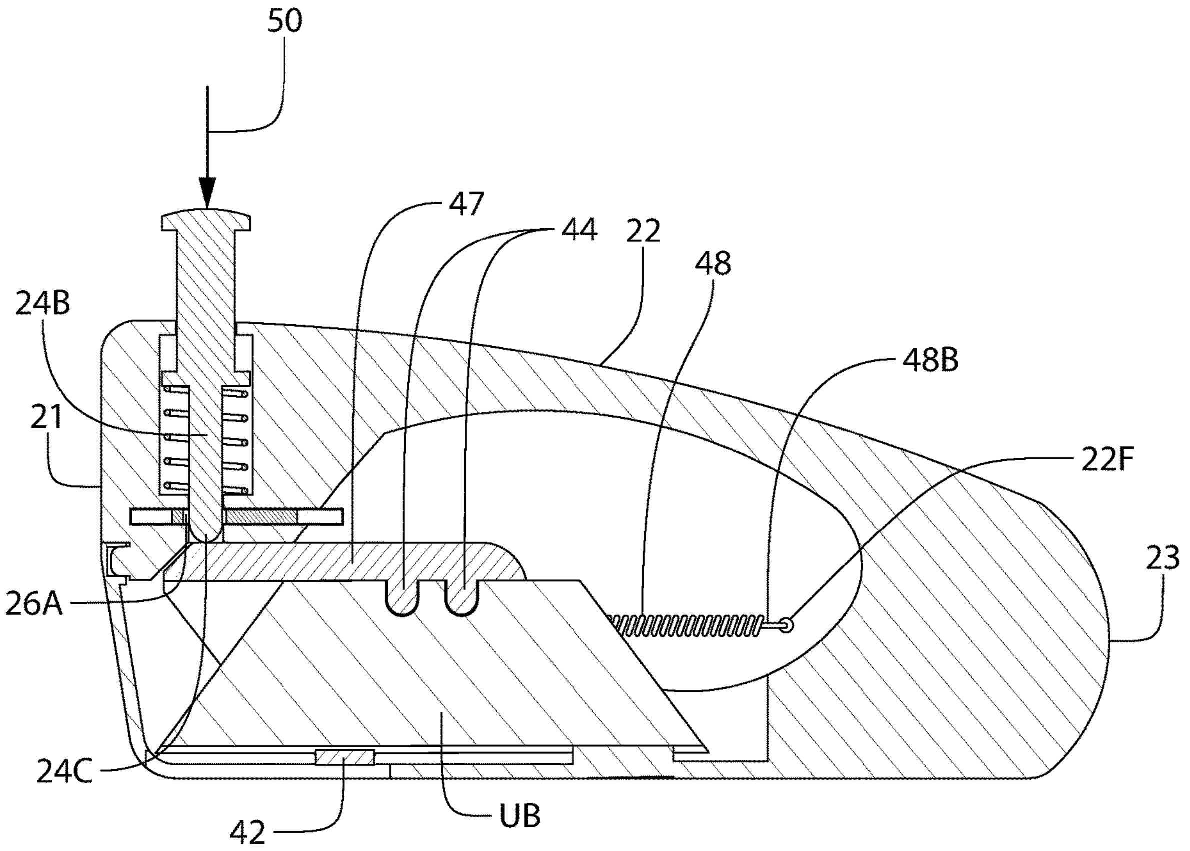
FIG. 6 is a side cross-sectional view similar to the view of FIG. 5 but showing the safety slide having been manually pushed backward by the user (the "enabling state" of the safety slide), which aligns an aperture within the safety slide with a shank of the activator to enable the activator to be depressed by the user.

FIG. 6 is a cross-sectional view of the SCD 20 showing the initial "cutting mode" operation of the device once the user slides the safety slide 26 towards the rear 23. In particular, the user is sliding the safety slide towards the rear 23 (e.g., pulling backwards on the flanges 26C/26D), against the bias of the spring 34 (FIGS. 3 and 4), which aligns the aperture 26A, while initially depressing the activator 24 in the direction of arrow 50. This brings the distal end 24C of the activator 24 into contact with a top edge 47 of the blade holder 40. At this point, if the user were to relieve the downward pressure on the activator 24, the spring 32 would immediately drive the activator 24 upward out of the aperture 26A and the safety slide 26 would immediately move towards the forward end 21, again, maintaining the utility blade UB within the housing 22. This will be discussed in more detail with regard to FIG. 8.

Figure 7:
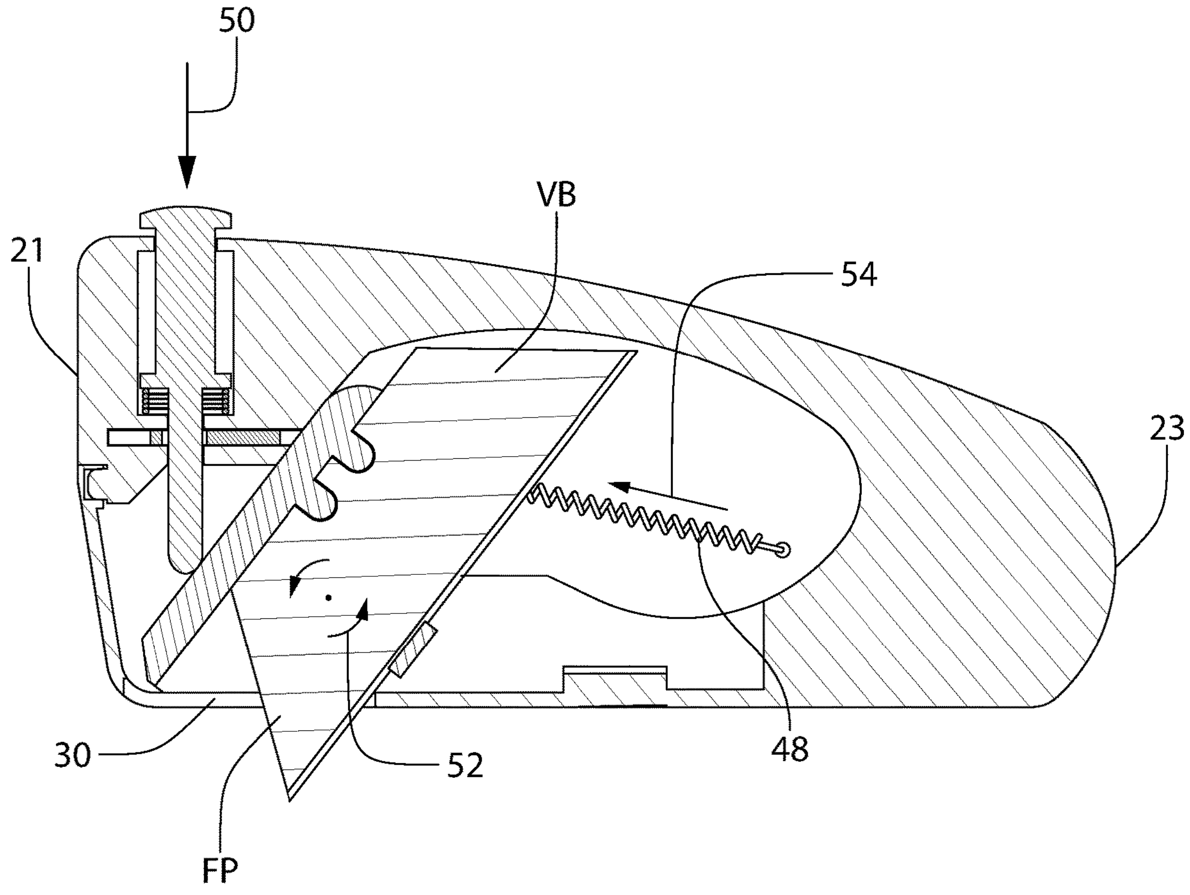
FIG. 7 is a side cross-sectional view similar to FIGS. 5-6, but with the activator fully depressed by the user to extend the blade out of the housing, which establishes a "cutting mode" of the safety cutting device.
Figure 9:
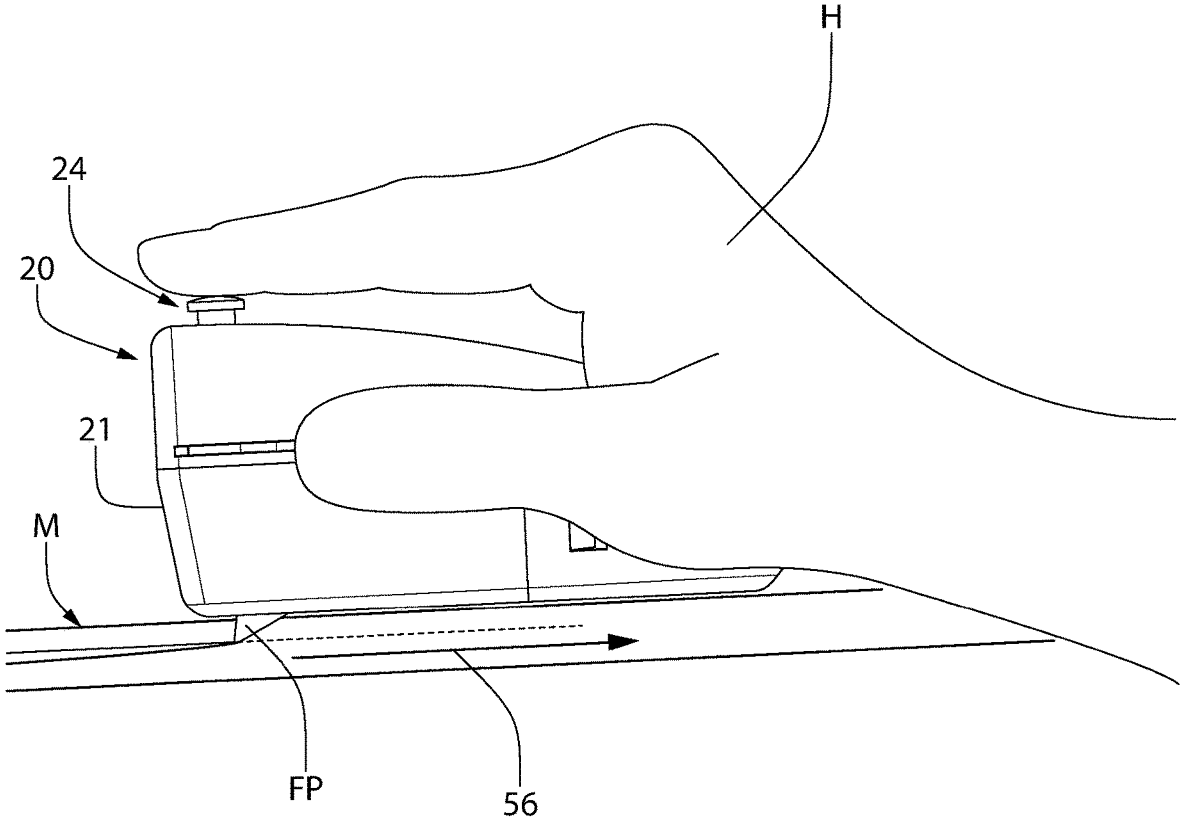
FIG. 9 depicts the cutting device being operated by a user to cut or score a material while holding and moving the safety cutting device in a direction that is parallel to the material being cut or scored.

FIG. 7 shows the final state of the cutting mode operation. If the user has maintained the downward pressure (arrow 50), the spring 32 is fully compressed and the activator shaft 24B has driven the blade holder edge 47 downward to pivot the blade holder 40 in the direction of arrows 52, against the bias (shown by arrow 54) of the expanded spring 48 thereby causing a forward portion FP of the utility blade UB to extend out of the housing aperture 30 on the bottom of the SCD 20; this extension of the forward portion FP out of the housing aperture 30 is also referred to as "protraction". As long as the user maintains this maximum downward pressure (arrow 50 in FIG. 7) on the activator 24, the user can now use the forward portion FP of the utility blade UB to cut or score a material M (FIG. 9). As shown in FIG. 9, the user is maintaining maximum downward pressure on the activator 24 and then displacing the SCD 20 in a direction (arrow 56) that is parallel to the material M being cut or scored. Notice that the user's hand H is not tilted upward as would be in conventional cutter devices but rather remains parallel to the material M as the SCD 20 is pulled in the direction of arrow 56.

Figure 8:
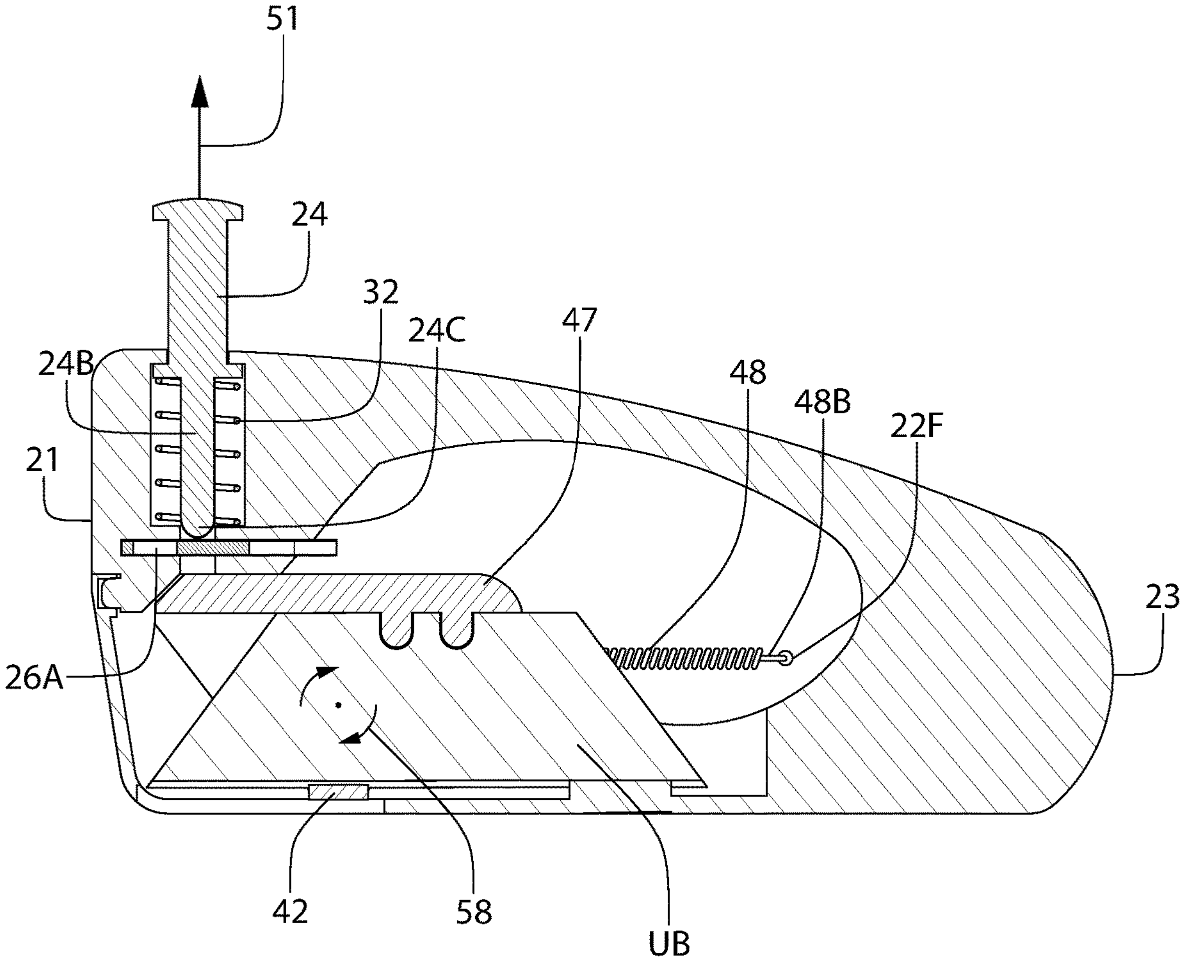
FIG. 8 shows the forces acting on the blade holder and activator to immediately move the cutting device from the "cutting mode" to the "safe mode" as soon as the user releases downward pressure on the activator.

FIG. 8 depicts the transition of the SCD 20 from the cutting mode to the safety mode. In particular, as soon as the user relieves the downward pressure on the activator 24, the spring 32 drives the activator 24 upward in the direction of the arrow 51. Once the distal end 24C is out of contact with the blade holder edge 47, the bias of the spring 48 in conjunction with shoulder screw 46 pivots the utility blade UB in the direction of arrows 58, causing the utility blade UB to immediately retract into the housing 22 and once the shaft 24B clears the aperture 26A in the safety slide 26, the safety slide 26 is immediately driven forward, thereby misaligning the aperture 26A from the distal end 24C of the activator and thereby preventing the accidental or intentional depression of the activator 24.

Figure 12:
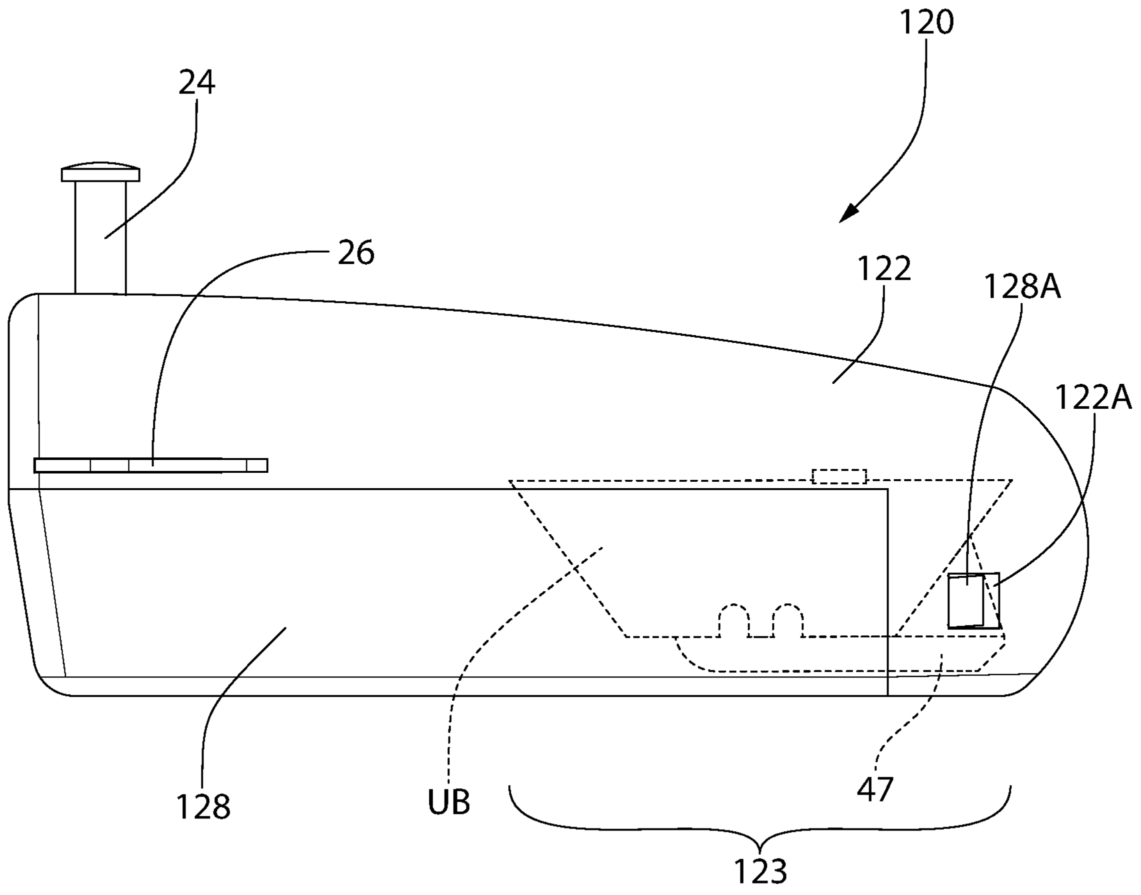
FIG. 12 is a second embodiment of the hand-held safety cutting device of the present invention that includes a stowage compartment for stowing another blade and corresponding blade holder therein.

FIG. 12 is second embodiment of the SCD 120 which comprises a longer housing 122, e.g., a longer posterior section 123, that includes a stowage area for storing additional razor blades and their respective holders (if different from the blade holder 40 already installed with the shoulder screw 46). The cover 128 is thus longer to provide access to these additional blades and holders 40/40' and is releasably secured using a latch 128A that secures with a housing aperture 122A. Other than those features, the SCD 120 comprises the same components and operates in the same manner as SCD 20.

It should be understood that the biasing members 32, 34 and 48 are shown by way of example only. These elements do not necessarily need to be springs but could be any structure that imposes a bias in the manner discussed above for each.

Other than the blades, shoulder screws and springs, all of the components of the SCD 20/SCD 120 may comprise polyurethane.

While the invention has been described in detail and with reference to specific examples thereof, it will be apparent to one skilled in the art that various changes and modifications can be made therein without departing from the spirit and scope thereof.

What is claimed is:

1. A hand-held cutting device for cutting a material with a safety feature that maintains a cutting blade retracted in the device, said cutting device comprising:

a housing having an aperture in a bottom surface thereof through which a portion of the cutting blade can pass;

a blade holder that is pivotally-mounted within said housing and biased to maintain the blade, releasably secured within said blade holder, within said housing;

an activator, operable by a user and biased against user operation, having:

a first state wherein said activator is out of contact with said blade holder and said blade is retracted within said housing; and a second state wherein said activator is in contact with said blade holder, said activator in said second state contacting and pivoting said blade holder to push a portion of said blade out of said aperture when the user applies pressure on said activator; and a safety member operable by the user that must be displaced from a first position to a second position that enables said activator to be operated by the user, said safety member being biased against movement to said second position; and wherein whenever the user releases pressure on said activator, said activator is automatically moved from said second state to said first state to automatically pivot said blade within said housing and said safety slide is automatically moved to said first position, preventing any further operation of said activator.

2. The hand-held cutting device of claim 1 wherein said activator is an elongated element that is displaceable downward into said housing for driving said blade holder to pivot downward.

3. The hand-held cutting device of claim 2 wherein said safety slide comprises an aperture and wherein said aperture of said safety slide is only aligned with said elongated element when said safety slide is in said second position.

4. The hand-held cutting device of claim 2 wherein said elongated element is positioned within a passageway having a spring therein and wherein said a portion of said elongated element is positioned within said spring.

5. The hand-held cutting device of claim 4 wherein safety member is positioned in a slot that is transverse to said passageway and said safety slide comprises an aperture and wherein said aperture of said safety member is only aligned with said elongated element when said safety slide is in said second position.

6. The hand-held cutting device of claim 5 wherein said safety slide comprises a sleeve housing a spring therein, said sleeve and spring being parallel to said slot, said spring biasing said safety slide towards said first position.

7. The hand-held cutting device of claim 1 wherein said blade holder is releasable from its pivotal mounting within said housing to permit another blade holder to be pivotally-mounted within said housing.

8. The hand-held cutting device of claim 1 wherein said cutting blade is a utility blade.

9. The hand-held cutting device of claim 1 wherein said cutting blade is a single edge razor blade.

10. The hand-held cutting device of claim 1 wherein said housing comprises a cover, said cover being releasably secured to said housing using a latch to permit access to said cutting blade and blade holder.

11. The hand-held cutting device of claim 1 wherein a spring is releasably secured to one end of said blade holder and releasably secured to said housing at its other end, said spring biasing said blade holder to be pivoted into a horizontal orientation, with a cutting blade edge parallel to a bottom surface of said housing, thereby completing retracting said cutting blade within said housing.

12. The hand-held cutting device of claim 1 wherein said blade holder is pivotally-mounted to said housing using a shoulder screw, said shoulder screw having threads on a first portion thereof for releasably securing to said housing and a second portion that comprises a smooth cylindrical surface to allow said blade holder to pivot about.

13. The hand-held cutting device of claim 1 wherein said housing further comprises an elongated posterior section for storing at least one additional cutting blade and at least one additional blade holder.

14. A method of using the hand-held cutting device of claim 1, said method comprising:

(a) displacing said safety member from said first position to said second position;

(b) applying pressure to said activator to drive said portion of the cutting blade out of said aperture;

(c) maintaining pressure on said activator;

(d) positioning said hand-held cutting device to be in a parallel orientation to the material;

(e) engaging said portion of the cutting blade to be in contact with the material; and (f) pulling said hand-held cutting device along the material, maintaining said parallel orientation to cut or score the material.

15. The method of claim 14 further comprising the step of releasing pressure on said activator to automatically retract said cutting blade into said housing and disabling said activator even if subsequent pressure is applied thereto.

* * * * *